April 7, 1953  E. LARSON  2,633,988
SIFTER AND MEASURING DEVICE
Filed March 30, 1950  2 SHEETS—SHEET 1
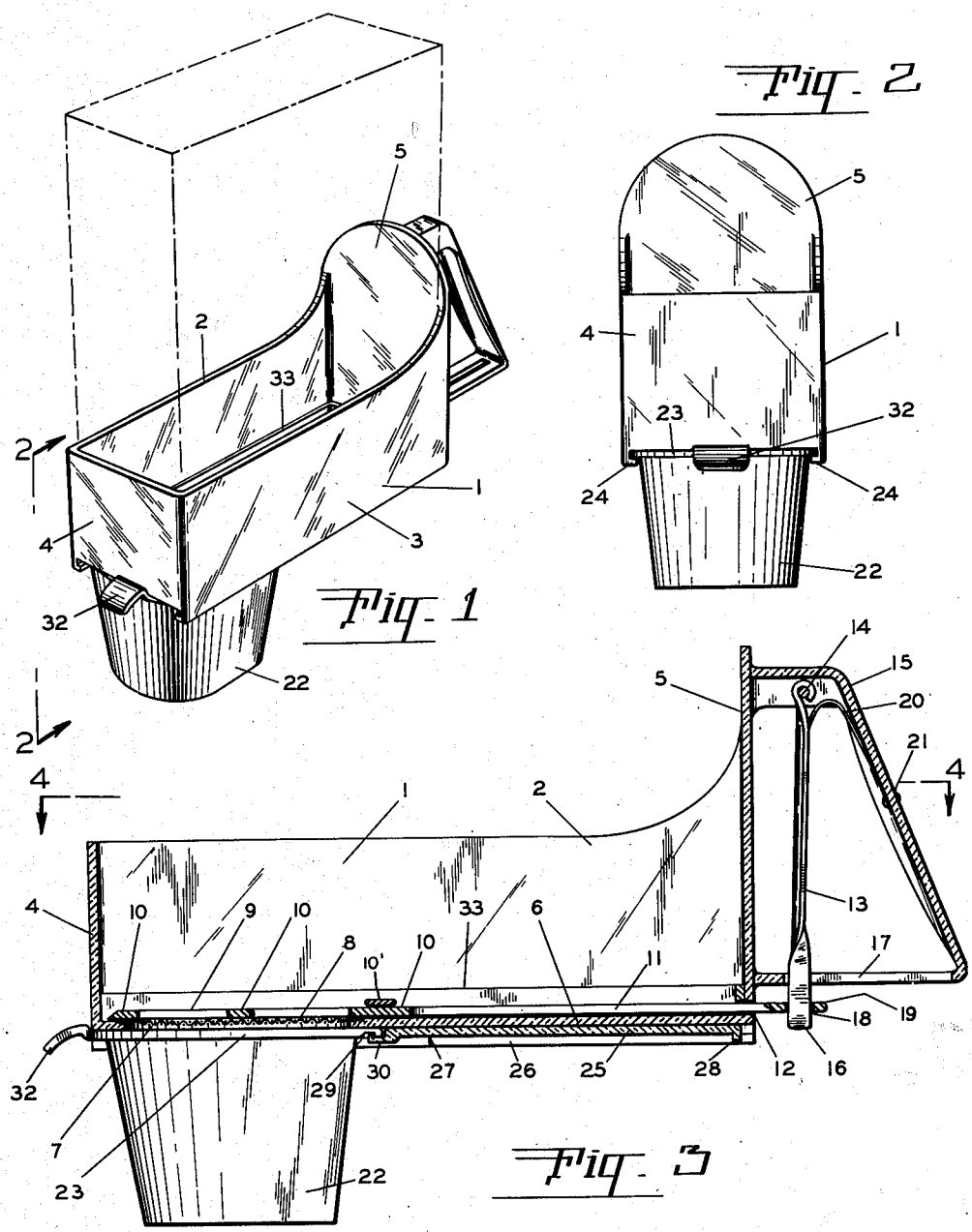
INVENTOR.
EUGENE LARSON April 7, 1953     E. LARSON     2,633,988
SIFTER AND MEASURING DEVICE
Filed March 30, 1950     2 SHEETS—SHEET 2
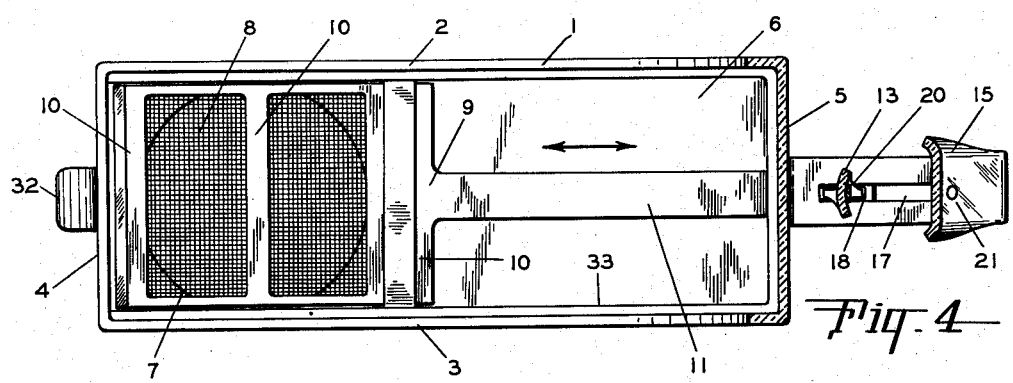
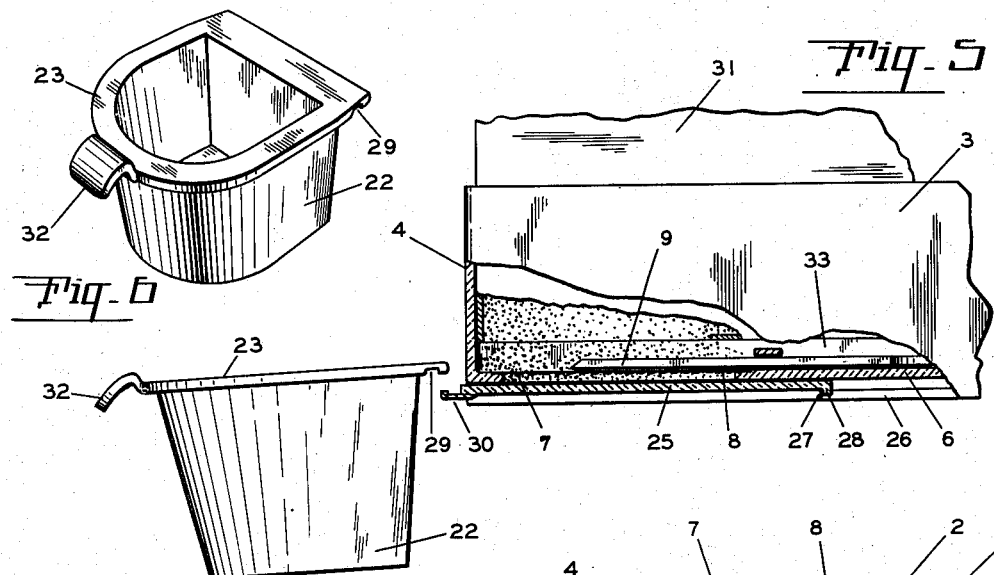
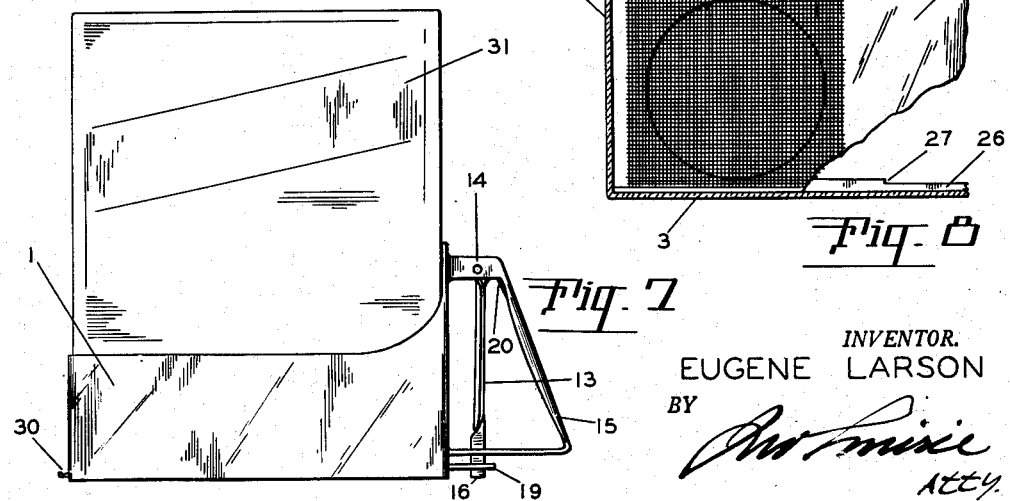
INVENTOR.
EUGENE LARSON
BY
ATTY.

Patented Apr. 7, 1953

2,633,988

UNITED STATES PATENT OFFICE 2,633,988

SIFTER AND MEASURING DEVICE

Eugene Larson, Birkenfeld, Oreg.

Application March 30, 1950, Serial No. 152,776

1 Claim. (Cl. 209—357)

This invention relates to sifters and measuring devices and is particularly adapted for sifting and measuring flour, sugar and the like.

The primary object of this invention is the combination of a sifter and measuring cup adapted to receive packages or cartons, as for instance cake flour and the like, so that the contents can be sifted directly from the container and measured into a receiving cup.

Another object of my invention is to provide a sifter and measuring combination wherein different sized measuring containers may be used with the sifting device.

With my new and improved sifter and measuring device the contents of a package or carton can be sifted and measured simultaneously, and when the measuring container is removed from the device it automatically shuts off the flow of the contents from the carton.

A further object of my invention is to design a sifter and measuring device that can be left on the carton containing flour and the like while not in use, except that the measuring container is removed therefrom.

These and other incidental objects will be apparent in the drawings, specification and claim.

Referring to the drawings:

Figure 1 is a perspective view of my new and improved sifter and measuring device, showing the position of a package or carton by broken lines.

Figure 2 is an end view of Figure 1 looking into the measuring container in the direction of line 2—2 Figure 1.

Figure 3 is a sectional side view of my new and improved sifter and measuring device illustrating the measuring cup in position for receiving the contents from a package.

Figure 4 is a plan sectional view taken on line 4—4 of Figure 3.

Figure 5 is a fragmentary, partly in section view, similar to Figure 3, except that the container is about to be placed under the sifter, or just having been removed therefrom, illustrating how the contents of the package can be blocked off until the measuring device is in place.

Figure 6 is a perspective view of the measuring container.

Figure 7 is a side view of my new and improved sifting and measuring device having a package or carton therein.

Figure 8 is a fragmentary sectional plan view, taken just over the screen and under the sifting unit.

Referring more specifically to the drawings: My new and improved sifter and measuring device consists of a box or receptacle 1, having sides 2 and 3, and ends 4 and 5, including a bottom 6. The bottom 6 has an opening 7 bridged by a screen 8. The said screen may be molded into the bottom 6 in the event of plastic material. An agitator 9, consisting of agitating bars 10 is adapted to move over the surface of the screen 8 by the action of the connection bar 11, which passes through the end wall 5 at 12 cooperating with an operating handle 13. A bar 10' extends across the receptacle and over the agitator to form a guide for and retain the agitator 9 against and in contact with the screen 8.

The operating handle 13 is pivotally mounted at 14 within the handle 15 at its upper end, and having its lower end 16 operating through the slot 17 of the said handle and extending downwardly therefrom, passing through the slot 18 formed within the end 19 of the connecting bar 11. The sifter unit 9 is held in the position illustrated in the drawings by the action of the spring 20, the said spring is anchored to the handle 15 at 21 at its one end and bears against the lever 13 at its opposite end, forcing the same to the position shown. The agitator bars 10 are operated back and forth over the screen 8 by the operator pulling the lever 13 towards the handle 15 while holding the unit, the spring 20 returning the sifter unit to its starting position.

I will now describe the operation of the measuring cup under the sifter. The measuring cup is indicated by numeral 22. This cup has an outwardly extending flange 23, which is adapted to slide in the guideway 24 of the side walls 2 and 3. A shutter 25 is also adapted to slide in the said guideway, said shutter closes the opening 7 of the bottom of the box 1. The flange 26 of the guideway 25 has a shoulder 27 against which the downwardly turned portion 28 of the shutter 25 engages, limiting the travel of the shutter to that illustrated in Figure 5.

A transverse tongue 29 is formed on the flange 23 of the container 22 and is adapted to enter the groove 30 on one end of the shutter, best illustrated in Figures 3 and 5. When the groove and tongue come together the flange 23 of the measuring container 22 will be in alignment with the shutter 25 and may enter the guideways 24, and when the container is pushed under the opening 7, the shutter 25 will be pushed from under the said opening as illustrated in Figure 3. The operator will then operate the lever 13 oscillating the agitator 9 causing the contents of the package 31 to be sifted through the screen 8 into the measuring container 22.

When the container is filled, the handle 32 of the container is grasped by the operator, the container 22 is pulled out of the guideways 24, at the same time the shutter 25 is pulled therewith by the tongue 29 of the container engaging the cross slot 30 of the shutter 25 referring to Figure 5, shutting off the flow of the contents from the container 31.

When the box or package 31 is installed in my sifting and measuring device a hole is cut in the corner of the carton so that the contents will flow from the carton through the opening 7 of the sifter. The carton 31 is spaced above the box or container and supported on the offset shoulder 33 within the box 1.

Several measuring containers 22 of various sizes are furnished with one of the sifting units 1. When the sifter unit and the carton or package is placed in its storage place, as for instance in the cupboard, the container is removed therefrom allowing the sifter unit to rest on the shelf of the said cupboard.

Although certain specific embodiments of the invention have been shown and described, it is obvious that many modifications thereof are possible. The invention, therefore, is not to be restricted except in so far as is necessitated by the prior art and by the spirit of the appended claim.

What I claim is:

A sifter, comprising an elongated receptacle formed in its bottom and at one end with an opening, parallel guides formed on the inside near the bottom of the receptacle, a manually operable shutter operating in the guides, the shutter having a lug at one end and a depression at its opposite end, a stop on the guideway with which the lug engages when the shutter is drawn toward the opening, a cup under the opening, said cup having side flanges which slide in the parallel guides, a lug on the rear of the cup to engage in the depression in the shutter, a screen over the opening, an agitator slidably mounted over the screen and in contact with the surface thereof, the agitator having a bar extending therefrom and through an opening formed in the end of the receptacle, a bar extending across the receptacle and over the agitator to form a guide for and retain said agitator in contact with the screen, a fixed handle on one end of the receptacle, a link pivoted to the upper part of the handle, the link extending through an opening formed in the end of the bar extending from the agitator, a spring interposed between the link and the handle to normally position the agitator over the screened opening in the bottom of the receptacle, whereby when the shutter is in open position, material can be sifted by reciprocating the agitator, or the screened opening closed by sliding the shutter under said opening.

EUGENE LARSON.

REFERENCES CITED

The following references are of record in the file of this patent:

UNITED STATES PATENTS

| Number | Name | Date |
| --- | --- | --- |
| 416,228 | Lary | Dec. 3, 1889 |
| 422,937 | Harrison | Mar. 11, 1890 |
| 513,489 | Eichler | Jan. 30, 1894 |
| 983,398 | Omberg | Feb. 7, 1911 |
| 1,419,338 | Wieneke | June 13, 1922 |
| 1,842,988 | Kranz | Jan. 26, 1932 |
| 1,988,122 | Horkavi | Jan. 15, 1935 |
| 2,416,810 | Bailey | Mar. 4, 1947 |
| 2,490,520 | Hazard | Dec. 6, 1949 |
| 2,500,059 | Burnham | Mar. 7, 1950 |
| 2,516,471 | Letsch | July 25, 1950 |